(12) United States Patent
Liu

(10) Patent No.: US 12,251,850 B2
(45) Date of Patent: Mar. 18, 2025

(54) TOOLING GUIDE FOR A MORTISE AND TENON JOINT

(71) Applicant: SUPER POWER TOOLS CO., LTD., Taichung (TW)

(72) Inventor: Yu-Chun Liu, Taichung (TW)

( * ) Notice: Subject to any disclaimer, the term of this patent is extended or adjusted under 35 U.S.C. 154(b) by 326 days.

(21) Appl. No.: 17/811,697

(22) Filed: Jul. 11, 2022

(65) Prior Publication Data

US 2024/0009884 A1 Jan. 11, 2024

(51) Int. Cl.
*B27F 5/02* (2006.01)
*B23Q 9/00* (2006.01)
*B27F 1/08* (2006.01)

(52) U.S. Cl.
CPC .............. *B27F 5/02* (2013.01); *B23Q 9/0042* (2013.01); *B27F 1/08* (2013.01)

(58) Field of Classification Search
CPC ............. B27F 5/02; B27F 1/08; B23Q 9/0042
See application file for complete search history.

(56) References Cited

U.S. PATENT DOCUMENTS

| | | | |
|---|---|---|---|
| 5,067,537 A * | 11/1991 | Offner | B27F 5/12 144/144.1 |
| 7,497,238 B2 * | 3/2009 | Williams | B27G 5/02 144/144.52 |
| 8,016,005 B1 | 9/2011 | Weinstein | |

* cited by examiner

*Primary Examiner* — Mohammed S. Alawadi
(74) *Attorney, Agent, or Firm* — Egbert, McDaniel & Swartz, PLLC

(57) ABSTRACT

A mortise and tenon joint tooling guide includes a base seat, two templates, an adjusting plate and a clamping structure. The base seat has a platform and an opening through the platform. Each of the templates can be arranged on the platform at intervals in a movable form. Each of the templates is formed with a guiding edge on one side. The guiding edges face each other and are used to guide the machining tool going through the opening to process a workpiece to form a mortise or tenon. The adjusting plate is configured on the base seat, capable of moving back and forth, and is used to abut against the workpiece, and to correct the distance between the template and the surface. The clamping structure is configured on the base seat, and is used to clamp the workpiece, so as to relatively position the platform and the workpiece.

10 Claims, 7 Drawing Sheets

TOOLING GUIDE FOR A MORTISE AND TENON JOINT

CROSS-REFERENCE TO RELATED U.S. APPLICATIONS

Not applicable.

BACKGROUND OF THE INVENTION

1. Field of the Invention

The present invention relates generally to a tool used to process a workpiece to form a mortise or tenon, and more particularly to a mortise and tenon joint tooling guide.

2. Description of Related Art Including Information Disclosed Under 37 CFR 1.97 And 37 CFR 1.98

A mortise and tenon joint is a structure to connect two workpieces, and is commonly used furniture, construction or other wooden products. A mortise and tenon joint comprises a mortise and a tenon. The mortise is a chamber formed on the end of another wooden component, and the tenon is a protrusion formed on the end of a wooden component. By inserting the tenon into the mortise, the two wooden components are connected.

U.S. Pat. No. 8,016,005B1 patent disclosed an assembled clamp used for cutting a workpiece to form a mortise or tenon, comprising a main body, wherein, the main body comprises a platform, said platform having an opening. A template is configured on the platform, and has a notch, the edges of the notch limiting the length and width of the tenon located in the opening, so as to guide the planer head to cut the workpiece to form a tenon. A first leg lock is located on one side of the opening and fixed below the platform. At least one component is mounted on the first leg lock, which can be adjusted by moving toward or away from the opening, and which has a face to contact the first face of the workpiece. A second leg lock comprises a first part of a thin and long component, a linear slideway, located below the platform and fixed on the main body. The second leg lock is configured below the linear slideway, and can be adjusted by moving toward or away from the opening. The second leg lock has a face to contact the second face of the workpiece. The second face is opposite the first face, so that the second leg lock and the component relatively clamp the workpiece.

Two swing arms are respectively installed below the platform. Two pivot shafts respectively go through the swing arm and are connected with the main body. Each of the swing arms can respectively swing around the pivot shaft. The length of the swing arm extends to pass the opening. The swing arm is used to maintain a parallel state between the end of the workpiece and the template. The assembled clamp is used to assist the processing of the end of the workpiece to form a tenon. In case the workpiece is configured in a fixed manner, the assembled clamp is configured on the end of the workpiece. At this point, the swing arm crosses the opening. Then, the main body is configured on the workpiece. The platform faces the end. The swing arm abuts the end, so that the tip of the end is parallel to the template. After moving the platform to align the end with the opening, the second leg lock and the component relatively clamps the workpiece. By now, the configuration of the assembled clamp is completed. When using a planer to process the end to form the tenon, the user operates the swing arms to turn away from the opening. The head of the planer goes into the opening and cuts the workpiece along the edge of the notch to form the tenon.

When placing the assembled clamp, the swing arm crosses the opening and abuts the end part. When the terminal end of the end part of the workpiece is formed with dips and bumps, the swing arm may come cross a certain dip on the end. When the swing arm turns away from the opening, the bumped part of the end in relation to the dip will hinder the rotation of the swing arm. Therefore, before placing the assembled clamp on the workpiece, the terminal end of the end part must be cut or ground properly. However, in the case of a mortise and tenon joint, the shape and size of the tenon matches the mortise for perfect insertion, and the depth of the mortise is usually slightly larger than the length of the tenon, so that the mortise can fully receive the tenon. Therefore, the degree of smoothness of the end of the tenon will not affect the combination between the tenon and the mortise. The degree of smoothness of the terminal end of the end part required by the assembled clamp increases the complexity and difficulty in processing the workpiece to form the tenon. On the other hand, when joining the mortise and tenon joint, usually an adhesive is applied. The excessive smoothness of the tenon will directly affect the adhesion.

BRIEF SUMMARY OF THE INVENTION

The main object is to provide a mortise and tenon joint tooling guide.

The problem-solving technical feature of the present invention lies in that the tooling guide for a mortise and tenon joint comprises a base seat comprising a platform, wherein, the thickness direction of the platform is defined as the first direction. The platform goes through an opening along the first direction, and the opening extends toward the second direction. The second direction is perpendicular to the first direction. The platform has a first plane and a second plane. The first plane and the second plane are opposite each other along the first direction. The second plane extends to the two ends of the platform in the second direction.

Two templates are stacked on the first plane, and respectively capable of moving along the second direction, wherein, the templates are configured along the second direction at intervals. Each of the templates is respectively formed with a guiding edge on one side. The guiding edges are opposite each other along the second direction. The right projection of the guiding edge along the first direction passes the opening. The guiding edges are used to guide the machining tool going through the opening to process a workpiece to form a mortise or tenon.

An adjusting plate is configured on the base seat and capable of moving back and forth along the second direction, wherein, the adjusting plates are plates of uniform thickness. The side of the adjusting plate in the thickness direction is formed with a third plane. The third plane and the second plane are opposite each other along the first direction. The right projection of the adjusting plate along the first direction is larger than the opening. The adjusting plate is used to abut against one surface of the workpiece, so as to adjust the distance between the template and the surface in the first direction. The adjusting plate is formed with a viewing part, for viewing the surface through the viewing part, so as to judge the relative positioning of the surface and the opening in the second direction and the third direction, and the third direction is perpendicular to the first direction and the second direction.

A clamping structure is configured on the side of the base seat in the first direction, wherein, the clamping structure is used to clamp the workpiece, so as to relatively position the platform and the workpiece.

The main benefits and advantages of the present invention is that, by abutting the adjusting plate on the surface, the position of the surface and the opening can be adjusted, and the adjusting plate can smoothly slide away from the range between the guiding edges. Before placing the workpiece on the preferred embodiment, the user does not need to make extra effort in cutting or grinding the surface. Therefore, it has a lower requirement for the smoothness of the surface, and can reduce the complexity and difficulty in processing the workpiece to form a mortise or tenon.

DETAILED DESCRIPTION OF THE INVENTION

Figure 1:
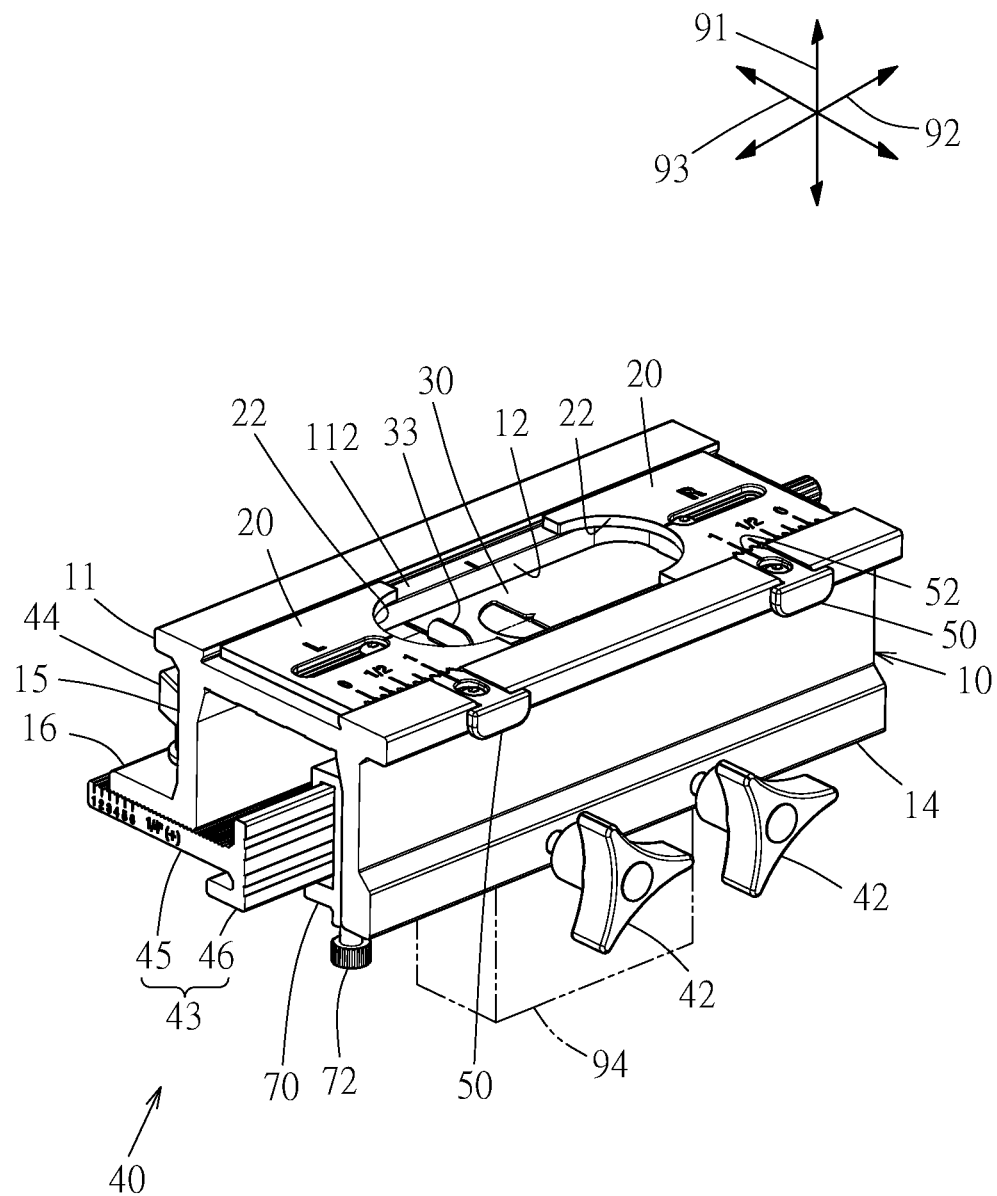
FIG. 1 is a perspective view of a preferred embodiment of the invention configured on a workpiece.
Figure 2:
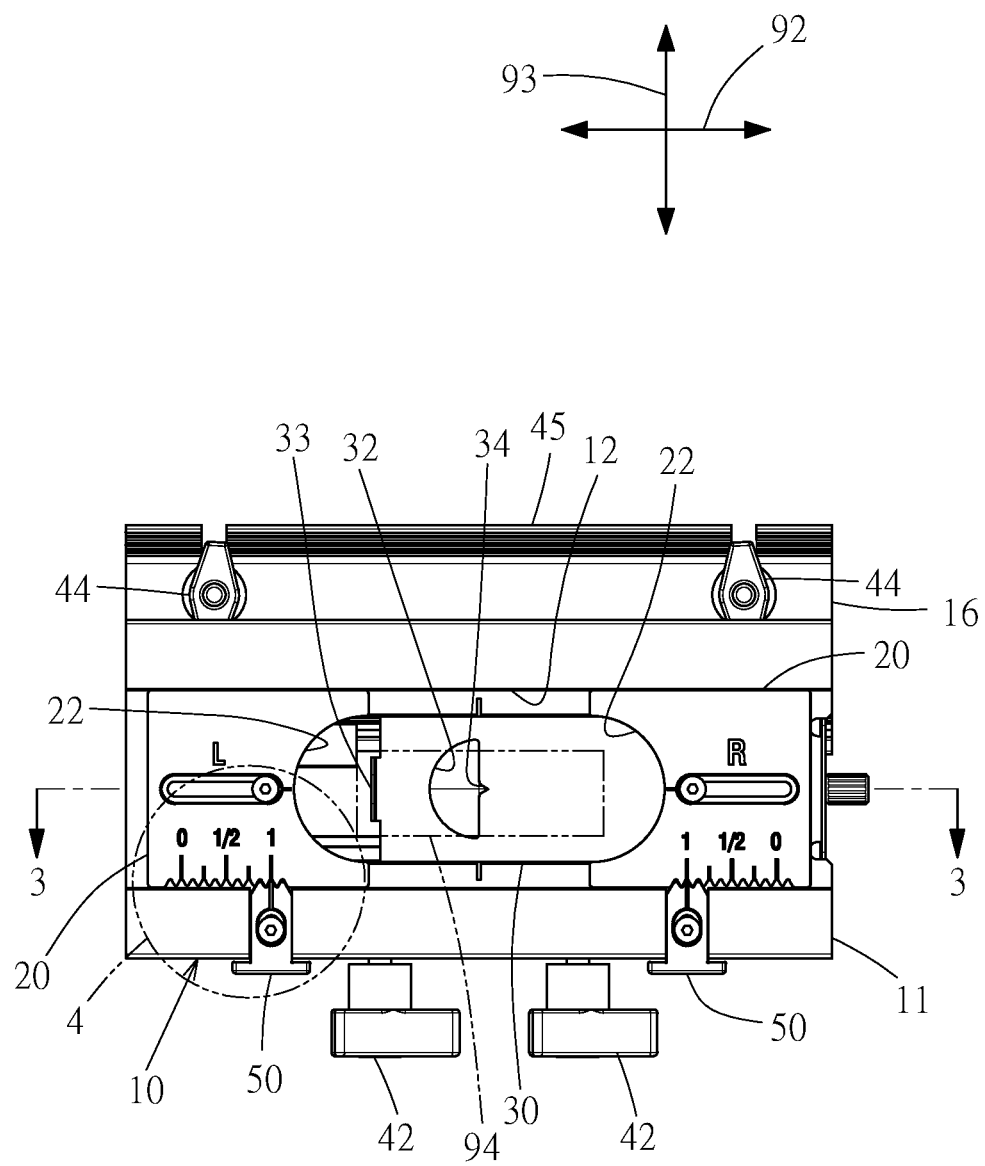
FIG. 2 is a top view of a preferred embodiment of the invention.
Figure 3:
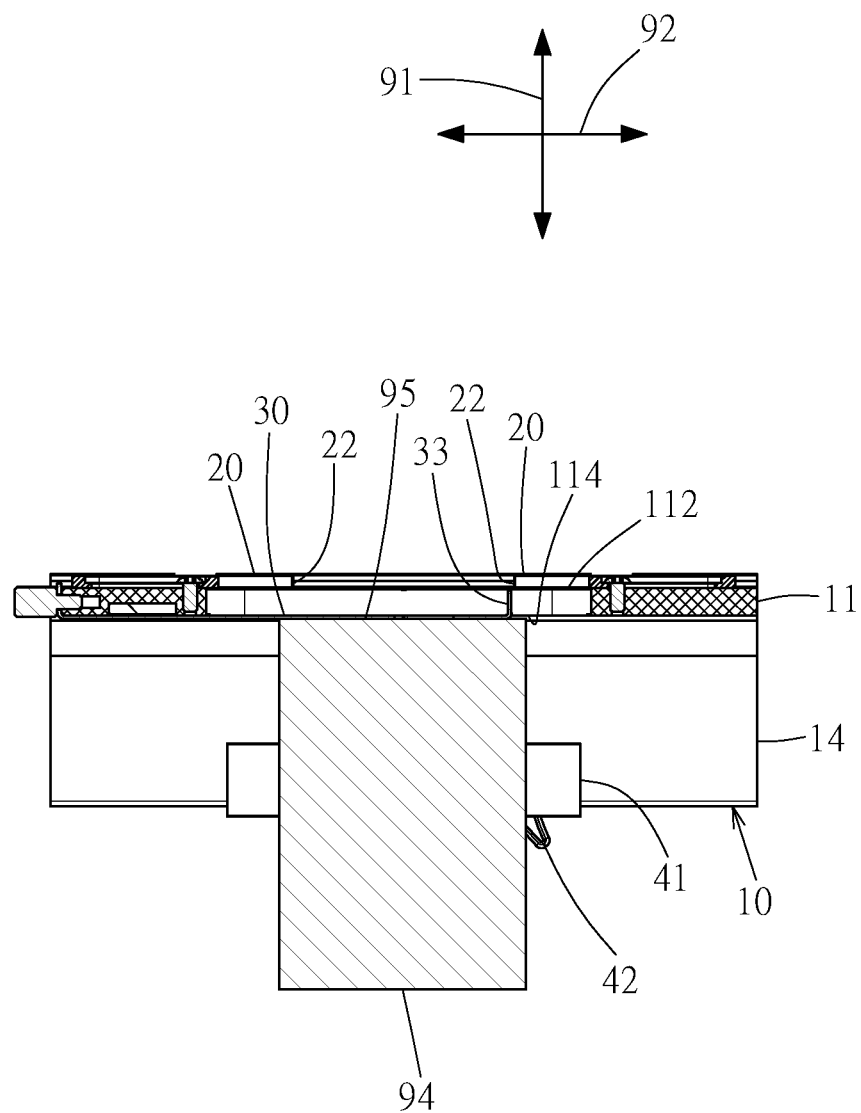
FIG. 3 is a 3-3 sectional view of FIG. 2.
Figure 4:
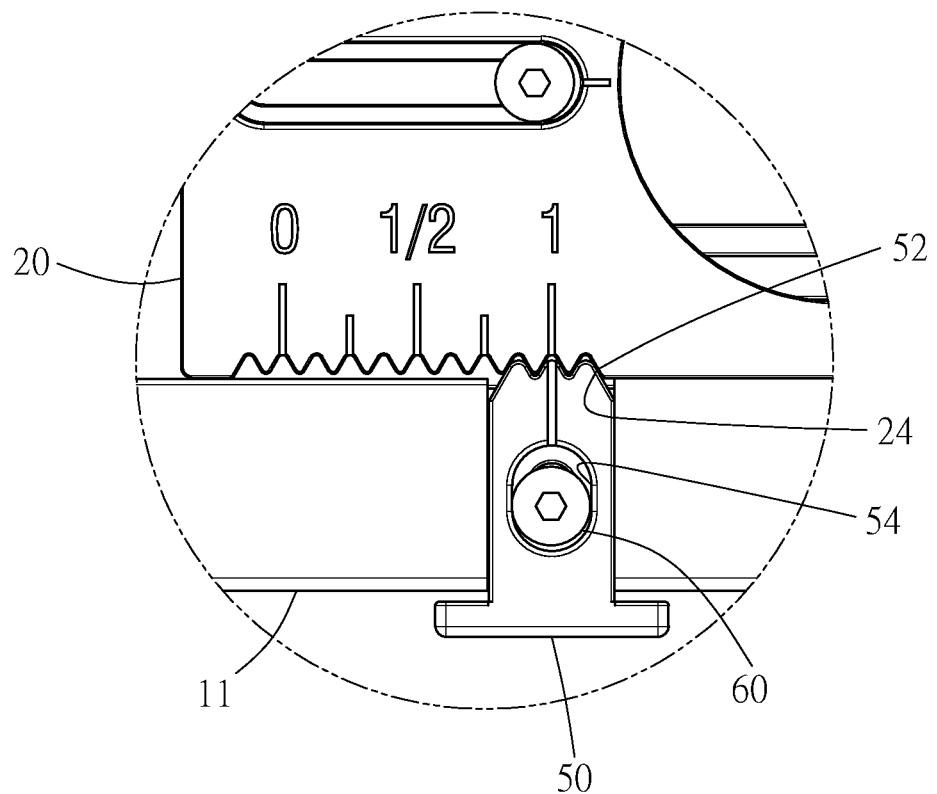
FIG. 4 is a partial enlarged view of FIG. 2.
Figure 5:
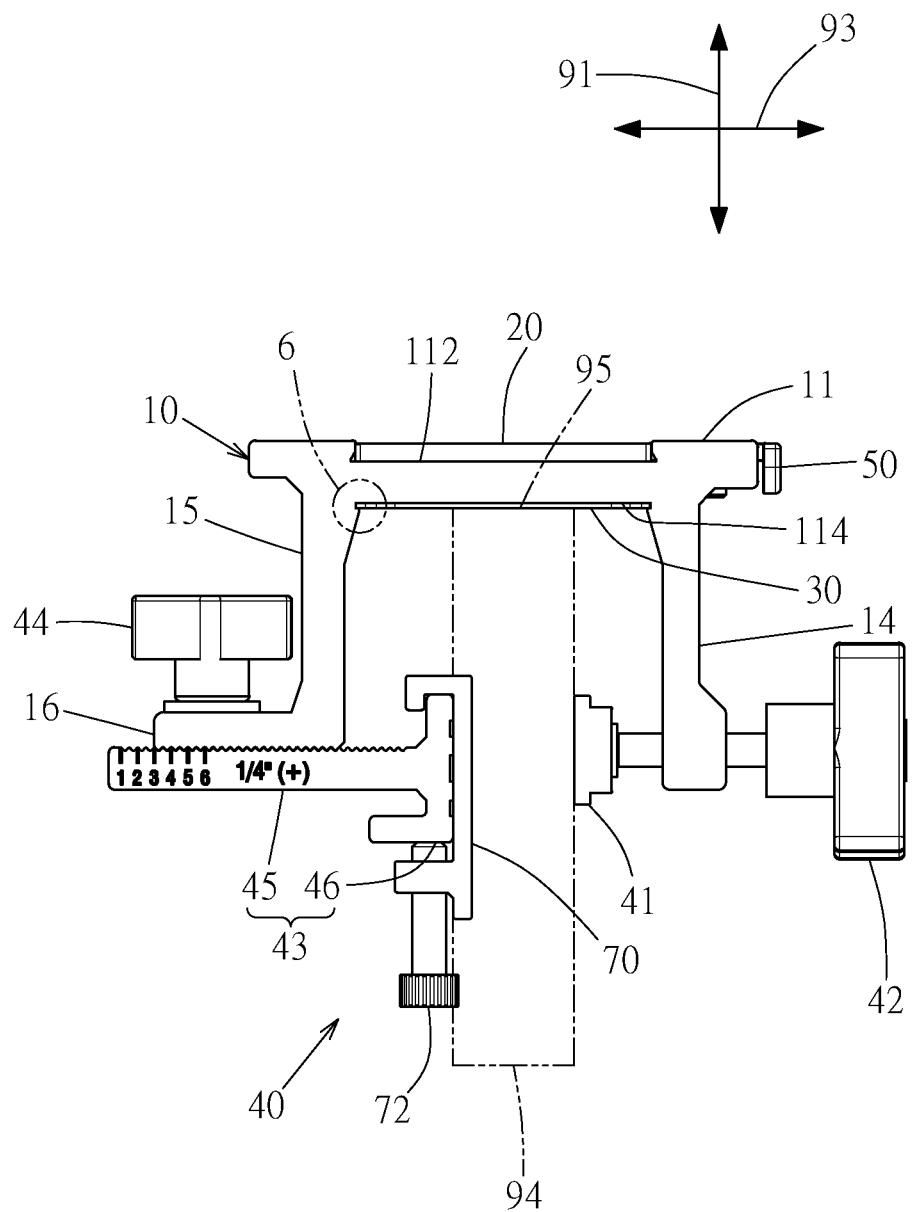
FIG. 5 is a left side view of a preferred embodiment of the invention.

Depicted in FIG. 1 through FIG. 7 is a preferred embodiment of the present invention of a tooling guide for a mortise and tenon joint, comprising a base seat 10, two templates 20, an adjusting plate 30 and a clamping structure 40. Said base seat 10 comprises a platform 11. The direction of the thickness of the platform 11 is defined as the first direction 91. The platform 11 goes through an opening 12 along the first direction 91, and the opening 12 extends toward the second direction 92. The second direction 92 is perpendicular to the first direction 91. A third direction 93 is defined to be perpendicular to the first direction 91 and the second direction 92. The opening 12 has a length along the second direction 92. The opening 12 has a width along the third direction 93. The platform 11 has a first plane 112 and a second plane 114. The first plane 112 and the second plane 114 are parallel to and face each other in the first direction 91. The second plane 114 extends to the two ends of the platform 11 in the second direction 92. The opening 12 extends to the first plane 112 and the second plane 114.

The templates 20 are stacked on the first plane 112, capable of moving along the second direction 92. The templates 20 are configured along the second direction 92 at intervals. Each of the templates 20 is respectively formed with a guiding edge on one side 22. The guiding edges 22 face each other in the second direction 92. The right projection of the guiding edge 22 along the first direction 91 passes the opening 12. The guiding edges 22 are used to guide the machining tool passing the opening 12 (not shown in the figure) to process a workpiece 94 to form a mortise or tenon (not shown in the figure).

The adjusting plate 30 is configured on the base seat 10, capable of moving back and forth along the second direction 92. The adjusting plates 30 are plates of uniform thickness. One side of the adjusting plate 30 in the thickness direction is formed with a third plane 31. The third plane 31 and the second plane 114 face each other in the first direction 91. The right projection of the adjusting plate 30 along the first direction 91 is larger than the opening 12. The adjusting plate 30 is used to abut against one surface 95 of the workpiece 94. The surface 95 is located at the end of the workpiece 94 in the first direction 91, so as to adjust the distance between the template 20 and the surface 95 in the first direction 91. The adjusting plate 30 is formed with a viewing part 32, for viewing the surface 95 through the viewing part 32, so as to judge the relative positioning of the surface 95 and the opening 12 in the second direction 92 and the third direction 93.

The adjusting plate 30 is made of a magnetic material. Correspondingly, the platform 11 is made of a permeable material. In this way, the adjusting plate 30 will magnetically absorb the platform 11. The third plane 31 abuts the second plane 114. Based on the material of the adjusting plate 30, the viewing part 32 goes through the hole of the adjusting plate 30 along the first direction 91.

As an option, at least the central part of the adjusting plate 30 can be a plate structure made of a transparent material (not shown in the figure) to substitute the above-mentioned hole as the viewing part 32, so as to form a variation not shown in the figures.

The clamping structure 40 is configured on the side of the base seat 10 in the first direction 91. The clamping structure 40 is used to clamp the workpiece 94, so as to relatively position the platform 11 and the workpiece 94.

When using the preferred embodiment to assist the tooling of the workpiece 94 to form a mortise or tenon, the surface 95 faces the platform 11, and the adjusting plate 30 abuts the surface 95, so that the surface 95 can be roughly parallel to the first plane 112 or the template 20. In case the preferred embodiment or the workpiece 94 is configured in a fixed manner, the user can view the surface 95 through the viewing part 32. The user can opt to control the preferred embodiment or the workpiece 94 to move, and position the surface 95 between the guiding edges 22 to adjust the position of the workpiece 94. After clamping the workpiece 94 by operating the clamping structure 40, slide the adjusting plate 30 along the second direction 92, so that the adjusting plate 30 leaves the position between the guiding edge 22. The adjusting plate 30 no longer blocks the surface 95 in the first direction 91, and the surface 95 is completely exposed in the opening 12. Thus, the machining tool can process the workpiece 94 through the opening 12 and along the guiding edge 22 to form a mortise or tenon.

When the adjusting plate 30 abuts the surface 95, if the surface 95 is formed with a plurality of dips and bumps, the flat adjusting plate 30 will not sink into a certain dip or gap, and the adjusting plate 30 can slide smoothly to move away from the position between the guiding edges 22. Before placing the workpiece 94 on the preferred embodiment, the user does not need to make extra effort in cutting or grinding the surface 95 in advance, the degree of smoothness of the surface 95 will not hinder the sliding of the adjusting plate 30. As the preferred embodiment has a low requirement for the smoothness of the surface 95, it is not very difficult to process the workpiece 94 to form a mortise or tenon, and the tenon produced will not have an excessively smooth end.

Figure 6:
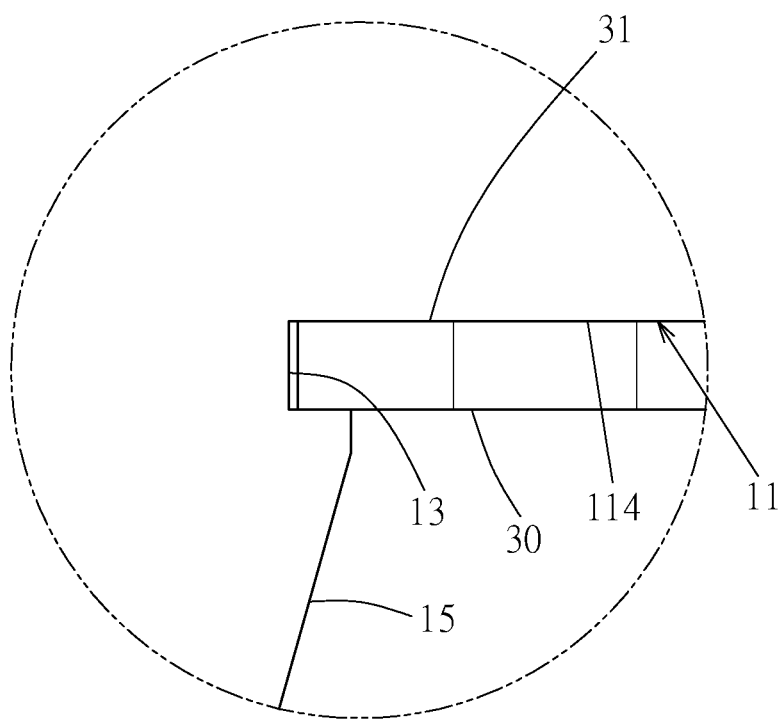
FIG. 6 is a partial enlarged view of FIG. 5.
Figure 7:
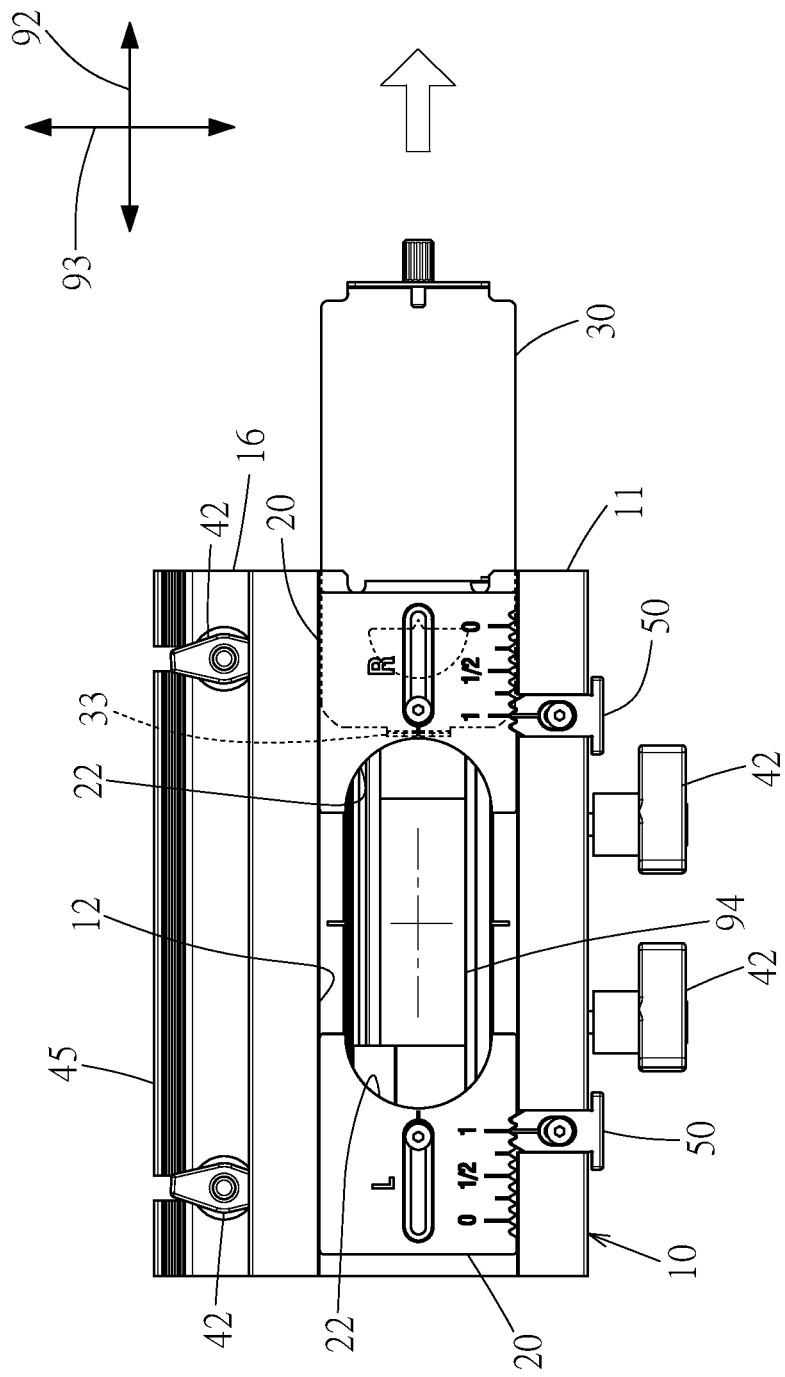
FIG. 7 is a top view of a preferred embodiment of the invention with its adjusting plate in the sliding state.

As shown in FIG. 6, the base seat 10 is formed with two caulking grooves 13. The adjusting plates 30 are located on the two sides of the third direction 93 and are respectively embedded into each of the caulking grooves 13. Thus, the material of the platform 11 and the adjusting plate 30 selected will not affect the positioning of the adjusting plate 30.

The side of the adjusting plate 30 in the second direction 92 is connected with a vertical plate 33. The vertical plate 33 goes into the opening 12. The height between the point of the vertical plate 33 located at the third plane 31 in the first direction 91 and the tip of the vertical plate 33 is less than the distance between the first plane 112 and the third plane 31. The vertical plate 33 can provide convenience for the movement the adjusting plate 30 along the second direction 92. The vertical plate 33 can completely leave the range between the guiding edges 22, and go into the side of the template 20 in the direction facing the first plane 112. The adjusting plate 30 will not hinder the machining tool in processing the workpiece 94 along the guiding edge 22, and the adjusting plate 30 can still maintain its position on the base seat 10. After completion of the processing of the mortise or tenon, the adjusting plate 30 can slide reversely to the original position, to be ready for the alignment before executing the next processing.

The adjusting plate 30 is formed with an indicating part 34, so as to indicate the alignment of the workpiece 94 and the opening 12 in the third direction 93. As the viewing part 32 goes through the hole of the adjusting plate 30, and the indicating part 34 goes through the hole of the adjusting plate 30 along the first direction 91, the indicating part 34 is communicated with the viewing part 32, and the width of the indicating part 34 in the third direction 93 decreases along the second direction 92, so as to indicate the alignment of the workpiece 94 and the opening 12 in the third direction 93.

Optionally, the indicating part 34 can be replaced by a linear sign, to form a variation not shown in the figures.

Each of the templates 20 is respectively formed with a plurality of concave bezels 24 on the side facing the third direction 93. The bezels 24 are sequentially configured along the second direction 92. Two locating pieces 50 are respectively configured on the platform 11, capable of moving back and forth along the third direction 93. Each of the locating pieces 50 respectively corresponds to each of the templates 20. Each of the locating pieces 50 is respectively configured with a plurality of convex teeth 52. The convex tooth 52 is embedded into the corresponding bezel 24, so that the template 20 is positioned in the second direction 92.

Based on the required size of the mortise or tenon, when it is needed to move the template 20 along the second direction 92 to change the distance between the guiding edges 22, the user can slide the locating piece 50 along the third direction 93 to move away from the template 20, so as to exit the convex tooth 52 from the bezel 24. When the template 20 moves along the second direction 92 to the required position, the locating piece 50 moves in the opposite direction, and the convex tooth 52 goes into the corresponding bezel 24, and the template 20 can be positioned again.

The number of convex teeth 52 can be increased or decreased as needed, but there should be at least one, and the number of convex teeth 52 is preferably less than the number of the bezels 24.

The locating piece 50 goes through a long groove 54. The long groove 54 extends along the third direction 93. A bolt 60 goes through the long groove 54 to connect with the platform 11. The configuration of the bolt 60 in relation to the long groove 54 can guide the direction of movement of the locating piece 50.

The base seat 10 further comprises a first holding arm 14 and a second holding arm 15, wherein said first holding arm 14 and said second holding arm 15 are respectively connected to the platform 11. The first holding arm 14 and the second holding arm 15 extend toward the direction away from the first plane 112. The first holding arm 14 and the second holding arm 15 face each other along the third direction 93. The projection of the opening 12 along the first direction 91 is located between the first holding arm 14 and the second holding arm 15, and the side of the second holding arm 15 away from the platform 11 along the third direction 93 is formed with a connecting plate 16.

The clamping structure 40 comprises a pressing plate 41, two first bolts 42, a limiting piece 43 and two second bolts 44, wherein said pressing plate 41 is located between the first holding arm 14 and the second holding arm 15. Each of the first bolts 42 respectively screws through the first holding arm 14 and is pivoted on the pressing plate 41, so that each first bolt 42 can drive the pressing plate 41 to move along the third direction 93. The limiting piece 43 is formed mainly by connecting a base plate 45 and a blocking plate 46. The base plate 45 is located at the side of the connecting plate 16 in the direction away from the platform 11, capable of moving along the third direction 93. The blocking plate 46 is located between the first holding arm 14 and the second holding arm 15, and the blocking plate 46 and the pressing plate 41 face each other along the third direction 93, so that the blocking plate 46 can limit the workpiece 94. The pressing plate 41 presses the workpiece 94 in the direction facing the blocking plate 46, so as to clamp the workpiece 94. Each of the second bolts 44 respectively screws through the connecting plate 16 and is pivoted on the base plate 45, so as to position the limiting piece 43.

A limiting plate 70 is configured on the side of the blocking plate 46 facing the pressing plate 41, capable of sliding along the second direction 92. The limiting plate 70 can abut against the side of the workpiece 94 facing the second direction 92. The limiting plate 70 is configured with a third bolt 72. The third bolt 72 is pressed upon the blocking plate 46, so that the workpiece 94 and the platform 11 can be relatively positioned in the second direction 92.

I claim:

1. A mortise and tenon joint tooling guide comprising:
    a base seat having a platform, the platform having a thickness along a first direction, the platform extending through an opening along the first direction, the opening extending toward a second direction, the second direction being perpendicular to the first direction, wherein the platform has a first planar surface and a second planar surface, the first planar surface and the second planar surface being in parallel relationship and facing each other along the first direction, the second planar surface extending toward opposite ends of said platform along the second direction;
    a pair of templates stacked on the first planar surface, said pair of templates being movable along the second direction, said pair of templates extending in spaced relation to each other along the second direction, each of said pair of templates having a guiding edge on one side, the guiding edges of said pair of templates facing each other in the second direction, wherein a right projection of the guiding edge passes the opening along the first direction, wherein the guiding edges are configured to guide a machine tool passing through the opening in order to process a workpiece to form a mortise or tenon;
    an adjusting plate positioned on said base seat, said adjusting plate being movable back-and-forth along the second direction, one side of said adjusting plate having a third planar surface, wherein the third planar surface and the second planar surface face each other, said adjusting plate having a right projection along the first direction that is larger than the opening, said adjusting plate adapted to abut against one surface of the workpiece so as to adjust a distance between one of said pair of templates and the third planar surface along the first direction, said adjusting plate having a viewing part, the viewing part allowing a viewing of the third planar surface therethrough in order to determine a relative positioning of the third planar surface and the opening along the second direction and a third direction, the third direction being perpendicular to the first direction and the second direction; and a clamping structure positioned on a side of said base seat that faces the first direction, said clamping structure adapted to clamp the workpiece so as to position the platform and the workpiece.

2. The mortise and tenon joint tooling guide of claim 1, wherein the platform is formed of a permeable material, said adjusting plate being formed of a magnetic material, said adjusting plate being magnetically attracted to the platform, the third planar surface abutting the second planar surface.

3. The mortise and tenon joint tooling guide of claim 2, wherein the viewing part extends through a hole of said adjusting plate.

4. The mortise and tenon joint tooling guide of claim 1, wherein said base seat has a pair of caulking grooves, said adjusting plates being embedded in at least one of the pair of caulking grooves.

5. The mortise and tenon joint tooling guide of claim 1, wherein said adjusting plate has a side facing the second direction, the side facing the second direction of said adjusting plate being connected to a vertical plate, the vertical plate extending through the opening.

6. The mortise and tenon joint tooling guide of claim 1, wherein said adjusting plate has an indicating part adapted to indicate alignment of the workpiece and the opening in the third direction.

7. The mortise and tenon joint tooling guide of claim 1, wherein said base seat has a first holding arm and a second holding arm, the first holding arm and the second holding being connected to the platform, the first holding arm and the second holding arm extending away from the first planar surface, the first holding arm and the second holding arm facing each other along the third direction, the opening being location between the first holding arm and the second holding arm, wherein a connecting plate is formed at a side of the second holding arm away from the platform, wherein said clamping structure has a pressing plate and a pair of first bolts and a limiting piece and a pair of second bolts, the plurality of positioning structure being positioned between the first holding arm and the second holding arm, each of the pair of first bolts being screwed through the first holding arm such that the first holding arm is pivotable on the pressing plate, the limiting piece being formed by a connection of said base plate and a blocking plate, said base plate positioned at a side of the connecting plate away from the platform, wherein the blocking plate is positioned between the first holding arm and the second holding arm, the blocking plate and the pressing plate facing each other along the third direction such that the blocking plate limits a position of the workpiece, the pressing plate adapted to urge against the workpiece in a direction facing the blocking plate so as to clamp the workpiece, each of the pair of first bolts and the pair of second bolts respectively screwed through the connecting plate such that the connecting plate pivots with respect to said base plate.

8. The mortise and tenon joint tooling guide of claim 7, wherein a limiting plate is positioned at a side of the blocking plate facing the pressing plate, the limiting plate piece being slidable along the second direction such that the limiting piece abuts a side of the workpiece, the limiting piece having a third bolt, the third bolt urging against the blocking plate.

9. The mortise and tenon joint tooling guide of claim 1, wherein each of said pair of templates is respectively formed with a plurality of concave bezels on a side thereof facing the third direction, the plurality of concave bezels extending along the second direction, wherein a pair of locating pieces are positioned on the platform and movable back-and-forth along the third direction, each of the pair of locating pieces respectively corresponding to each said pair of templates, each of the pair of locating pieces has at least one convex tooth embedded in a corresponding bezel of the plurality of concave bezels.

10. The mortise and tenon joint tooling guide of claim 9, wherein at least one of the pair of locating pieces extends through an elongated groove extending along the third direction, wherein a bolt extends through the elongated groove and connects with the platform.

* * * * *